United States Patent [19]

Schaich

[11] 4,450,795

[45] May 29, 1984

[54] FOUR-STROKE PISTON ENGINE

[76] Inventor: Josef Schaich, 118 Oschle 7906, Markbronn, Fed. Rep. of Germany

[21] Appl. No.: 302,993

[22] Filed: Sep. 17, 1981

Related U.S. Application Data

[63] Continuation-in-part of Ser. No. 957,661, Nov. 3, 1978, abandoned, Continuation-in-part of Ser. No. 854,904, Nov. 25, 1977, abandoned, which is a continuation of Ser. No. 643,165, Dec. 22, 1975, abandoned.

[30] Foreign Application Priority Data

Dec. 24, 1974 [DE] Fed. Rep. of Germany ....... 2461444

[51] Int. Cl.³ .......................... F01L 1/28; F02B 3/00
[52] U.S. Cl. .................................. 123/79 C; 123/279; 123/295; 123/296; 123/297; 123/301; 123/306
[58] Field of Search ..................... 123/79 C, 301, 295, 123/296, 297, 279, 306, 309, 276

[56] References Cited

U.S. PATENT DOCUMENTS

| | | | |
|---|---|---|---|
| 1,657,108 | 1/1928 | Clemens | 123/79 C |
| 1,786,946 | 12/1930 | Hoffman | 123/79 C |
| 1,828,792 | 10/1931 | Tverbakk | 123/79 C |
| 1,925,614 | 9/1933 | Straussler | 123/79 C |
| 2,269,104 | 1/1942 | Hedlund | 123/79 C |
| 2,466,321 | 4/1949 | Mackenzie | 123/301 |
| 2,471,509 | 5/1949 | Anderson | 123/79 C |
| 2,935,055 | 5/1960 | Neir | 123/79 C |
| 3,003,483 | 10/1961 | Buchi | 123/79 C |
| 3,094,974 | 6/1963 | Barber | 123/301 |
| 3,154,059 | 10/1964 | Witzky | 123/79 C |
| 3,195,520 | 7/1965 | Simko | 123/301 |
| 3,318,292 | 5/1967 | Hideg | 123/79 C |
| 3,504,681 | 4/1970 | Winkler | 123/301 |
| 3,641,986 | 2/1972 | Fricker | 123/79 C |

FOREIGN PATENT DOCUMENTS 22950 of 1907 United Kingdom .

Primary Examiner—Ronald B. Cox
Attorney, Agent, or Firm—Jeffers, Irish & Hoffman

[57] ABSTRACT

A four-stroke piston engine in which air is drawn into a cylinder while rotary motion about the cylinder axis is imparted to the air. Fuel may be blown/injected into the air during its rotation in the cylinder while the fuel supply is located on the axis of the cylinder and supplies at least one jet of fuel directed radially outwardly and which jet of fuel in cooperation with the rotating air forms at least one helical stream of mixture within the cylinder, preferably during the compression stroke, which is transformed into a coherent mixture zone enclosed by a ring of air upon completion of compression. The piston may have a recess in the upper end into which the fuel nozzle is received when the piston approaches top dead center so that an enriched region is formed in the recess which can be ignited by electrodes disposed adjacent the recess.

17 Claims, 5 Drawing Figures

FOUR-STROKE PISTON ENGINE

CROSS REFERENCE TO RELATED APPLICATIONS

This is a continuation-in-part of Application Ser. No. 957,661 filed Nov. 3, 1978, now abandoned which is a continuation-in-part of Application Ser. No. 854,904, filed Nov. 25, 1977 now abandoned, which is a continuation of Application Ser. No. 643,165 filed Dec. 22, 1975 now abandoned.

BACKGROUND OF THE INVENTION

The present invention relates to reciprocating piston engines and, in particular, to an engine of this nature in which a piston reciprocates in a cylinder within which zones having differences in fuel enrichment are established.

The cylinder, furthermore, comprises a head having channels for establishing directionally oriented gas flow into the cylinder.

It is known to subdivide an engine cylinder to establish chambers to which fuels for different enrichment of the air are supplied. In such engines, the richer mixture is ignited and the mixture of lesser richness is ignited from the richer mixture. Engines of this nature are stable under various load conditions, including constant load, but have a high rate of fuel consumption and are characterized in loss of power because of flow and thermal losses.

It is also known to construct engines in which the cylinder space is not subdivided but which includes devices for generating regions of differing fuel-air mixtures within the cylinder. Such engines have a better fuel economy than the ones referred to above when the motor is under less than full load and, as in connection with the first mentioned engine, have a low quantity of noxious emissions in the exhaust gases. This last mentioned type of engine is, however, unstable in operation.

The object of the present invention is the construction of a reciprocating piston engine in such a manner that mixing zones are established in the cylinder which show different ratios of fuel to air thereby obtaining the advantages of the type of engine in which a richer fuel-air mixture is ignited which, in turn, ignites a lower ratio fuel-air mixture, thus improving thermal efficiency and reducing the emission of pollutants.

One object of the present invention is the provision of a reciprocating piston engine of the nature referred to which is stable in operation under all load conditions.

A further object of the present invention is the formation of fuel-air mixture zones which are differently enriched with fuel and enclosed by a ring and/or cylinder of pure air to increase thermal efficiency.

BRIEF SUMMARY OF THE INVENTION

During operation of the engine, air enters the cylinder. The air is caused to rotate around an axis of the cylinder, preferably by adjustable guide vanes arranged in the region of the inlet valve disk and in the outlet valve. The intake valve is preferably located substantially coaxially on the longitudinal axis of the cylinder and the intake port, the guide vanes and the intake valve disk are shaped appropriately so that the air will rotate in the cylinder, substantially without turbulence and peculiarities, during the compression stroke, expansion stroke and exhaust stroke.

In the entire load range the angle of entry as well as the quantity of air entering the cylinder may be changed by varying the pitch of said movable guide vanes. When the cylinder becomes filled the flow of air in the cylinder is being superposed with the rotating flow of air getting in. The helical motion of the air is directed downwardly, and its direction is reversed from downward to upward with the beginning of the compression stroke while the direction of rotation remains unchanged.

While the speed of rotation of the air will increase slightly, air from within the piston-swept space enters the compression space during the compression stroke. Hereby, the gas particles do not change their position relative to each other significantly. For the proper formation of the desired mixture configuration, it is important that the rotating air enters the compression space without turbulence and peculiarities.

The mixture formation in the piston-swept and compression spaces occurs during operation of the engine by at least one first nozzle located within the region of the longitudinal cylinder axis and in the lower region of the compression space and supplying jet of fuel extending substantially outward toward the cylinder wall during the compression stroke. Due to the gas rotation in the cylinder, the jet, when viewed axially of the cylinder, is deflected by the air and broken up. The primary and secondary motions of the air, and the motion of the air relative to the vapor jet occurring during mixture formation, create a helical mixture zone which extends toward the cylinder head and form a coherent, substantially rotary-symmetrical zone of basic mixture upon completion of compression, the diameter of which is smaller than that of the cylinder if the jet of fuel blown into the piston-swept and/or compression space has an appropriate length. The jet of vapor, or jets if more than one first nozzle is used, breaks or break up in the air before it or they reach the cylinder wall, and if the fuel is liquid, the droplets will evaporate before they reach the cylinder wall due to relative movement and heat transfer between air and fuel.

For even distribution of the fuel transversely to the axis of the cylinder out to a limit defined by a circle whole diameter is smaller than that of the cylinder, and for the formation of a transition zone of small volume between the basic mixture and the air enveloping the basic mixture, the jets of fuel have a particular configuration. This shape of jets is due to the aerodynamic forces acting on said jets.

The shape of the jets of fuel and the distribution of fuel transversely to the longitudinal axis of the cylinder can be governed by the blow-in pressure of the fuel, the amount of fuel, the two blow-in angles relative to the axis perpendicular to the longitudinal cylinder axis, the cross-section of the first nozzles, the nozzle cone, the length of the nozzles, temperature of fuel and duration of blow-in over the degree of crank angle, with gaseous or liquid fuel supply and by appropriate selection and setting of these parameters to suit the parameters pertaining to the air itself, such as the speed of rotation of the air, the density and temperature, secondary speed, pressure and speed profile in the rotating air, in order to obtain a predetermined mean air ratio in the basic mixture and to maintain the air ratio transversely to the longitudinal cylinder axis essentially constant. The above mentioned parameters of the gas rotation in the cylinder are influenced by the stroke/bore ratio, the engine speed, the pitch angle of the vanes and the cross-section of the intake means, among other things.

The jets will bring about a relatively uniform fuel distribution up to a certain radial limit, and outwardly therefrom there is a rather narrow transition zone separating the basic mixture from the air.

To obtain the desired basic mixture enclosed by a ring of pure air and a predetermined air ratio within the zone of the basic mixture prior to combustion, some of the aforementioned parameters are controlled with respect to time and during one single cycle of fuel blow-in. In a preferred embodiment, this control occurs essentially between the end of the intake stroke and the point of ignition of the mixture in the cylinder.

During the compression of the fuel vapors in the cylinder, the parameters pertaining to the rotating air will change due to uneven piston movement and changes of volume.

The density and temperature of the air will unevenly increase during compression in the cylinder, while, furthermore, the amount of vaporized fuel which flows through the upper part of the piston-swept space in which the fuel jets are disintegrated by the air increases during compression.

To create in the piston-swept and compression spaces an essentially rotary-symmetrical zone of desired basic mixture, the air content of which is substantially constant over the longitudinal cylinder axis and wherein the diameter of the zone is smaller than the cylinder diameter, fuel delivery curves of the fuel pump are required which correspond to the characteristic fuel demand curves of the engine. The shapes of the characteristic fuel demand curves are defined in particular by the parameters relating to the air blow, which vary during mixture formation, and by the load. The amount of fuel discharged from the nozzle per crank angle degree at the end of the mixture forming process is several times higher than the amount of fuel discharged per crank angle degree at the beginning of the mixture forming process.

For example, the characteristic curves for a corresponding fuel pump output may be achieved by means of a cam which is shiftable in the axial direction with the cam configuration being different in respective axial positions thereof, so that the said pump curves correspond to the characteristic fuel demand curves at any point of load.

Furthermore, adjustment of the fuel nozzle cross-section of the first nozzles to the parameters pertaining to the air and fuel throughout the operational range of the engine and also during each individual mixture forming process may be expedient for achieving the result referred to. The shape and the length of the fuel jet, when viewed in the axial direction of the cylinder, are subject to variation during the mixture forming process. During operation of the engine with the said basic mixture in the cylinder, said mixture extends from the center of the cylinder out to within 5 to 25 millimeters of the inner cylinder surface, for example.

The change in the fuel nozzle cross-section of the first nozzles during mixture formation may be caused mechanically by adjustment of a needle disposed in the nozzle. A cam is also employed for adjusting the nozzle needle and is also adjustable in the axial direction with different cam formations being provided at different axial regions along the cam. Connection of the cam to the nozzle needle is by means of mechanical elements provided on and in the nozzle carrier, an advantageous arrangement being one whereby the force applied to the nozzle needle is transmitted by a further cam acting directly on the nozzle needle. The cam outside the nozzle carrier is driven by means of suitable drive elements. A device transforms parameters such as engine speed, vane pitch and pump cam position into control signals which serve to adjust by means of a suitable control device and mechanism, the cam for adjustment of the nozzle cross-section of the first nozzles provided in the compression space.

The adjustment of the nozzle cross-sections for the formation of the basic mixture zone can thus be effected in conformity with the parameters relating to the fuel and the air swirl.

Further fine adjustment of the nozzle cross-section of the first nozzles may be effected by evaluating signals from a sensor placed in the cylinder head which senses temperature in the cylinder in order to control the diameter of the basic mixture during operation of the engine and, in particular, during the nonstationary phases. Therefore, fuels of different boiling curves may be used if all other parameters remain unchanged and the fuel is blown in in the gaseous state.

A number of possibilities exist in connection with the generation of the ignition mixture, said ignition mixture being formed by the first nozzle which forms the basic mixture or a second nozzle which is exclusively provided for forming the ignitable mixture.

One possibility in connection with the formation of an ignitable mixture is to generate the body of the mixture shortly before ignition takes place and directly in the region of the piston recess and of the nozzle carrier. This can be accomplished by taking into account the operational parameters pertaining to the fuel, the air and the basic mixture and causing at least one jet to impinge upon a spoonlike member, which jet flows out from the first nozzle, which forms the basic mixture, or from a second nozzle.

The spoon-like member is connected to the piston in the region of the piston recess and extends upwardly therefrom. Its height and position relative to a first or second nozzle carried by the nozzle carrier is arranged such as to trap the fuel last supplied by the respective nozzle and a few crank angle degrees prior to ignition. The gas flow pushes the cloud of enriched fuel-air mixture to the region of the electrodes. The electrodes are arranged in the region of the first or second nozzles, laterally above them on the circumference of the nozzle carrier taking into account further parameters.

A further possibility in respect of forming the ignitable mixture is to introduce an appropriate amount of fuel into the mixture flowing in the region of the piston crown and the nozzle carrier toward the end of the formation of the fuel-air mixture by means of the first or second nozzles and to ignite the resulting mixture. In this case, the configuration of the upper surface of the piston and of the piston recess, the time when fuel blow-in is completed, the moment of ignition, the position of the first and/or second nozzles, the position of the electrodes, the rotational speed of the gases and the amounts of mixture and fuel involved are of importance.

A still further possibility concerning the formation of an ignitable mixture consists in forming the ignitable mixture in a chamber. A substantially cylindrical or spherical recess in the upper end of the piston is substantially closed by the nozzle and electrode carrier when the piston moves in the region of the upper dead center position and forms a chamber. A few crank angle degrees before ignition takes place, when the recess in the piston is substantially closed by the nozzle carrier, liquid or gaseous fuel may be blown/injected into the chamber by means of the first or a further second nozzle, which for this type of forming the ignitable mixture is expediently disposed on the end face of the nozzle carrier, taking into account the relevant parameters. The burning gases which emerge from the slot between the nozzle carrier and the recess in the piston have high velocity, and can cause turbulence in the mixture in the cylinder in at least the inner region of the space above the piston, which accelerates combustion. In this embodiment of the means for forming the ignitable mixture, the electrodes are disposed on the circumference and/or the face of the nozzle and electrode carrier.

In one embodiment, fuel is introduced as a liquid into a chamber disposed in the lower part of the nozzle and electrode carrier or between the nozzle and electrode carrier and the fuel pump and having small volume and a relatively large surface. The vapor formed in this chamber flows out from the first nozzles immediately following the chamber or disposed in spaced relation to said chamber. Heating and/or cooling the chamber by means of a suitable fluid enables the temperature of the vaporized fuel to be adapted to the relevant parameters while the engine is running and a vapor to be formed when the engine is first started, whereby a temperature sensor in the chamber and other suitable devices provide for control of the heating and cooling fluid. The fluid flowing through the nozzle carrier supplies heat when the engine is started and provides for cooling of the nozzle carrier and substantially even distribution of the heat throughout the nozzle carrier once the engine has reached operating temperature.

If the fuel is vaporized in a chamber located outside the nozzle and electrode carrier, the fuel line between said chamber and the mixture-forming nozzles as well as the nozzles themselves must also be heated in order to prevent condensation of the super-heated vaporized fuel and to enable the necessary temperature of the fuel vapor to be maintained. This temperature is determined by the least volatile fuel components and the gas pressure in the cylinder upon completion of compression. It may be expedient to provide the line between the chamber and the first nozzles with a valve capable of relieving the fuel line on completion of the mixture formation.

The gas pressure in the cylinder which continues to rise after completion of the mixture forming process causes mixture from the cylinder to enter the line while the nozzles are open and the fuel to flow back into the tank via the briefly opened relief valve so that only the mixture which builds up in the line flows into the cylinder during the expansion stroke. If a relief valve is used, the function of the nozzle needles is limited to changing the nozzle cross-sections. The nozzles need not be closed on completion of the mixture forming process. However, if no relief valve is used, it is advisable to close the first nozzles by means of the nozzle needles on completion of the mixture forming process. The relief valve is suitable for both gaseous and liquid fuel.

BRIEF DESCRIPTION OF THE DRAWINGS

The exact nature of the present invention will become more clearly apparent upon reference to the following detailed specification taken in connection with the accompanying drawings in which.

DETAILED DESCRIPTION OF THE INVENTION

Figure 1:
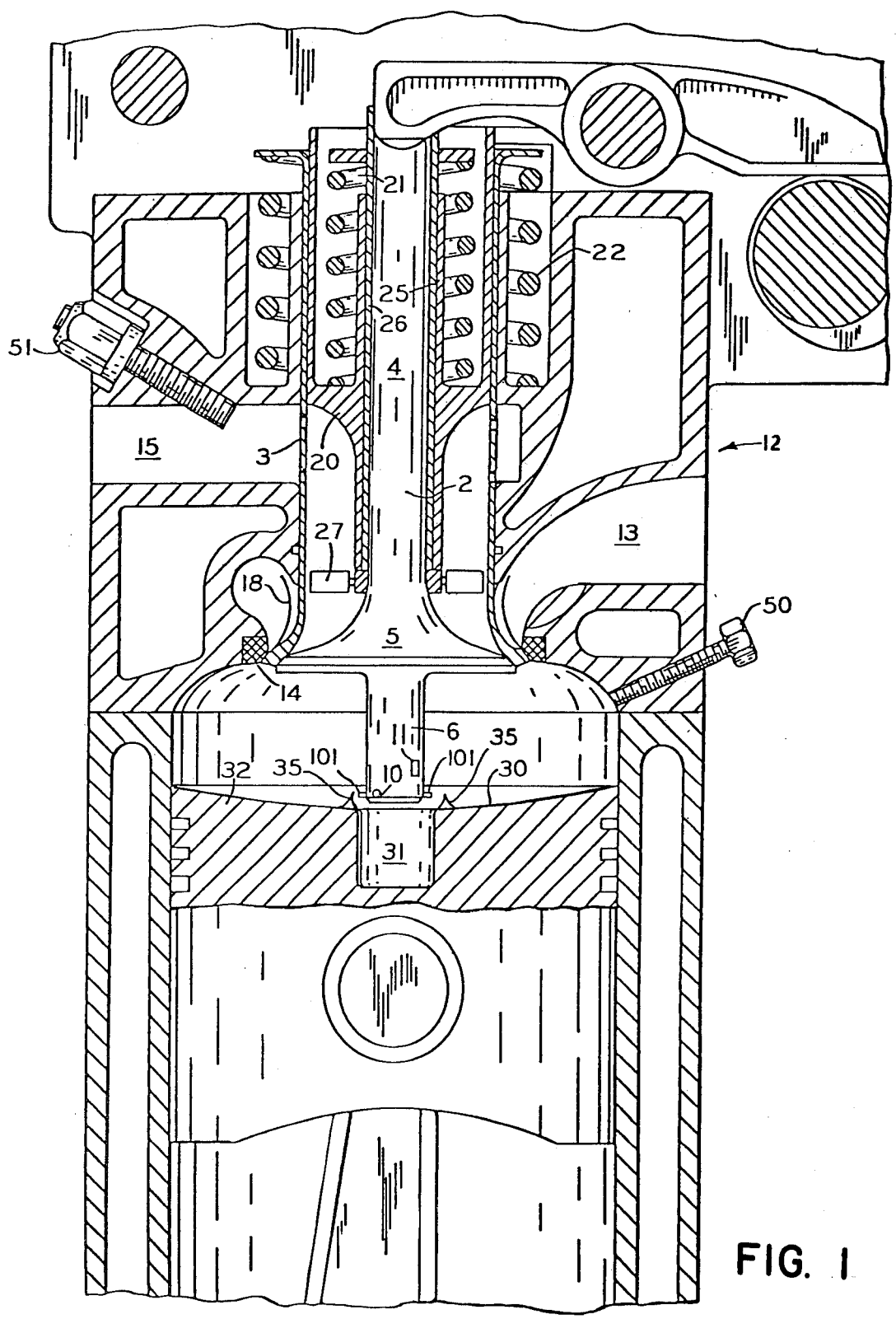
FIG. 1 is a vertical cross-section through an engine cylinder head in accordance with the present invention, showing the position of the piston approximately 45 crank angle degrees before top dead center, referring to approximately 100 mm piston stroke.
Figure 2:
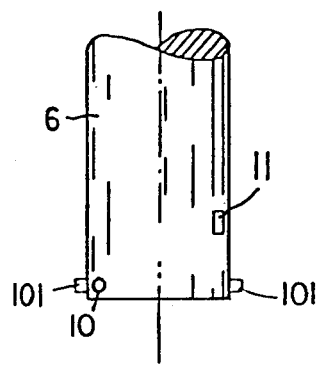
FIG. 2 shows that part of the nozzle and electrode carrier which projects into the compression space.
Figure 3:
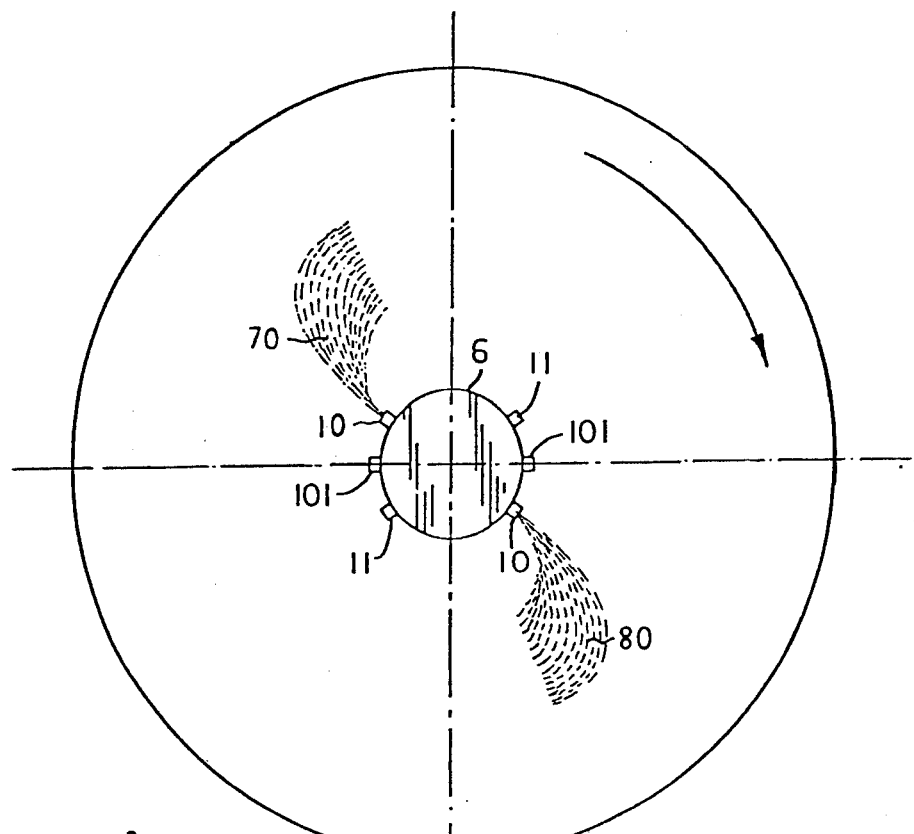
FIG. 3 is a view looking in the axial direction of the cylinder and showing the jets of fuel supplied by the first fuel nozzles.
Figure 5:
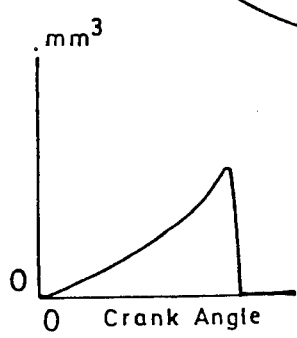
FIG. 5 shows a characteristic fuel demand curve of the engine.
Figure 4:
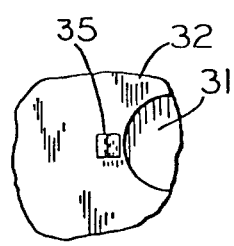
FIG. 4 shows the spoon disposed on the piston crown in the region of the recess in the piston.

Inside the cylinder head 12 is provided an inlet valve 2 which is coaxial with the piston and to the longitudinal axis of the cylinder to which it pertains. Another tubular valve 3 is provided which is coaxial with and surrounds valve 2 and acts as an outlet valve. Valve 2, which consists of a stem 4 and a valve disk 5, is also hollow and carries a nozzle carrier 6 which is screwed into the head end of valve 2 on the axis of the valve, and extends into the lower region of the compression space of the pertaining cylinder.

In addition to fuel lines inside the nozzle carrier 6 is located an electric lead which has not been drawn and which conducts the igniting current to the electrodes 11 located on the nozzle carrier 6. The fuel lines through which the first and second pumps pump fuel to the first nozzles 10 and the second nozzles 101 may incorporate valves through which fuel which builds up in the lines upon completion of the mixture formation process may flow back into the tank. Inside the nozzle carrier 6 is located a control needle (not shown) with appropriate mechanical elements which establishes a connection between a space cam and nozzle needles in the nozzles 10. In order to enable the nozzle carrier 6 to be maintained at the temperature determined by the fuel, especially in the region of the compression space, the nozzle carrier is provided with bores for a heating and cooling fluid.

The first fuel nozzles 10 and the second fuel nozzles 101 are installed in the lower region of the nozzle carrier 6 and the first nozzles 10 are provided with nozzle bores which are essentially radial to the cylinder wall and transverse to the longitudinal axis of the cylinder. The position of the electrodes 11 at the nozzle carrier 6 depends upon the region in which the ignition mixture is located at the very moment when the spark flashes over between the electrodes. The different partial fuels, the ignition current, the heating and cooling fluid, the current to the temperature sensor and the mechanical work for the actuation of the control needle are supplied to the nozzle carrier 6 via flexible leads and mechanical elements.

The outer valve 3, which is movably supported inside the cylinder head 12 in two bores, controls the exhaust channel 13 which annularly encircles the outlet valve 3. The outlet valve 3, when closed, comes to rest upon the valve seat insert 14 located in the cylinder head. The outlet channel 13 is found in the lower region of the cylinder head 12. The inner valve 2, which is movably supported in the sleeve 26, controls the inlet channel 15 which annularly encircles the outlet valve.

Between the inlet channel 15, which is found in the central region of cylinder head 12, and the outlet channel 13, the cylinder head 12 is widened by boring or drilling so that the outer valve 3 can become movably supported. The outer valve 3, in the region of the compression space, serves also for the formation of the outlet and the inlet channels, and it is protected against the hot exhaust gases by a tubular apron 18. In the web portion of the cylinder head which separates the gas channels 13 and 15 from each other, there is provided a sealing and lubricating means for valve 3.

The inlet channel 15 surrounds outer valve 3 and openings in the stem of the outer valve 3 in the region of the inlet channel permit the gas required for the combustion to enter into the inside of tubular outer valve 3. By the action of the inner valve 2, the end of outer valve 3 is closed and opened as the piston reciprocates in the cylinder. The end of outer valve 3 is constructed to form the valve seat for inner valve 2 and the head of valve 3.

Above the inlet channel 15, the outer valve 3 is movably supported in the cylinder head 12.

Fitted into the upper region of the inside of the valve 3, there is provided an insert 20. The insert is fitted into outer valve 3 such that this may shift axially. The insert is held stationary by supports (not shown) which are attached to the cylinder head and reach across the stem of the outer valve. In order to reduce the wear and tear on both of valves 2 and 3, outer valves 3 is permitted to turn intermittently about the longitudinal axis thereof.

Insert 20 has a recess in which valve springs 21 are supported and which engage a valve spring retainer on the inner valve 2. The valve spring 22 for the outer valve 3 rests directly on the cylinder head 12 and acts on a flange on the upper end of valve 3.

Inside the insert 20 are provided two sleeves 25, 26, the outer one 25 of which is integral with the insert 20 and at the lower end is adjacent valve disk 5. Sleeve 25 carries the movable guide vanes 27.

The inner sleeve 26 is rotatably supported in sleeve 25 and extends from the guide vanes 27 upwardly to beyond the upper end of insert 20. Valve 2 is supported in sleeve 26 in a manner permitting it to move axially whereby the supporting of the inner sleeve 26 and of the inner valve 2 occurs essentially without any play. The cam shaft acts via rocker arms upon the valves 2, 3 or upon connection parts at the valve stems. Outer valve 3 may be provided with a valve turning device.

The piston crown 30 has a parabolical or circular depression and incorporates a piston recess 31 in the region of the longitudinal axis. When piston 32 moves in the region of the upper dead center position, part of the nozzle carrier 6 will be in recess 31. Piston crown 30 carries at the rim of piston recess 31 a spoon-like element 35 which faces the second nozzle 101, or the first nozzle 10 and since inlet valve 2 is not allowed to rotate, this situation will occur on each piston stroke.

Sleeve 26 protrudes upwardly beyond insert 20 and is electromechanically controlled by means of a control device which evaluates the parameters related to the fuel and the engine and is coupled to the first device controlling the nozzle cross-sections. At the lower end of sleeve 26, the rotary motion by a gear system (not shown) is transferred to the guide vanes 27.

The sensor required for the control, which is located in the cylinder head, is indicated at 50. The fuel jets are denoted as 70 and 80.

Numerous embodiments of the invention may be visualized. In this connection, reference is made to the subclaims. The first nozzle 10 may have an axial component relative to the longitudinal axis of the cylinder and/or a circumferential component relative to the nozzle carrier. According to a further embodiment, a plurality of first fuel nozzles 10, rather than one, are provided which may, for instance, be offset 180° to ech other or 90° to each other and feature different bores whereby the openings of these nozzles may be arranged in such a manner that they will not only point in different outward directions, but also incorporate identical or different axial and circumferential components with respect to the longitudinal axis of the cylinder and/or identical or different circumferential components with respect to the nozzle carrier. The individual nozzle 10 may be oriented such that the fuel jet is initially discharged therefrom perpendicularly to the longitudinal axis of the cylinder either in the direction of rotation of the air swirl or opposite to the direction of rotation of the air swirl. It may be advantageous to use first nozzles 10 of a type which provides small jet angles. The most expedient number of nozzles 10 depends, among other things, on the angle of flow of the fuel jets and the angle at which the air hits the fuel jets.

In any embodiment of the invention it is important that the number of nozzles and the various parameters of the jets of blown-in or injected fuel be adapted to the air swirl and its parameters in such a manner that a coherent mixture zone is formed which is enclosed by a transition zone of small volume and a ring of air and in which the fuel is distributed so as to meet the requirements of a low consumption and low pollution engine. In any embodiment of the invention it is also important that, taking into account the primary and secondary motions of the air and the residual gas, the outlet openings of the nozzles to be oriented in such a manner as to assure a favorable distribution of the fuel in the basic mixture and a high degree of utilization of the air flowing in the inner and intermediate region of the piston-swept and compression spaces and to minimize enrichment of the residual gas with fuel.

The nozzle carrier may be shorter than shown in FIG. 1 and the recess 31 in the piston may be correspondingly less deep or be omitted entirely. Moreover, if one or a plurality of nozzles 10 are used, the single nozzle or one or two of a plurality of nozzles 10 or all nozzles 10 may be disposed in the region between the end of the nozzle carrier and the valve plate. An advantageous arrangement is one in which the individual nozzle openings are oriented outwardly and with a component directed downwardly toward the piston in order to thereby also counteract the deflection of the fuel jets by the secondary motion of the air.

The ignitable mixture is formed by the nozzles 10 or the nozzles 101 in the region of the nozzle carrier and the piston crown taking into account the parameters related to the second partial fuel stream and the air and/or mixture swirl and the construction of the piston and the nozzle carrier. Alternatively, the ignitable mixture may be formed using the said spoon 35 or in the substantially cylindrical or spherical recess in the piston. The most appropriate state of aggregation of the fuel depends on the state of aggregation of the fuel intended for the formation of the basic mixture. For any type of ignition mixture formation it is important that a composition of the mixture be achieved which may be ignited by a normal ignition spark. If the ignitable mixture is formed outside the recess in the piston by the second nozzles 101, it is important that the two partial streams of fuel delivered by the pumps be correlated in a predetermined manner such that the proper value for the air ratio in the 'cloud' of ignitable mixture is obtained. Furthermore, the amount of residual gas flowing in the region of the nozzle carrier and the amount of gas flowing out of the recess in the piston during ignition mixture formation if the ignitable mixture is formed outside the recess in the piston must also be taken into account in determining the amount of fuel required to form the ignitable mixture.

Blow-in or injection of the second parti 1 fuel stream for forming the ignitable mixture commences at positions of the piston located about 5 to 50 crank angle degrees before the position of the piston at ignition, depending on how the ignitable mixture is formed.

The second partial fuel stream may be delivered by a second run, vaporized in a further chamber and fed to the nozzles 101 via appropriate heated lines (cooled if the fuel is injected in the liquid state), these lines being equipped with relief valves like the lines for the first partial fuel stream. The second pump and the second chamber may be omitted if the nozzles 101 are designed as injection valves opening at a predetermined pressure just before the mixture forming process reaches completion.

If the nozzles 101 are disposed on the circumference of the nozzle carrier, the outwardly directed openings may feature any of a number of different radial and axial components. If the nozzle 101 is disposed on the face of the nozzle carrier with an axially directed discharge opening, said opening may feature any of a number of different radial components.

In one embodiment, the fuel for the formation of ignitable mixture 'clouds' is directed by means of two nozzles 101, which are disposed at an angle of 180° to each other, on an inclined path downwardly against the two spoons 35 provided on the piston crown which are also offset against each other by 180°, and which are located opposite the nozzles 101 before or during ignition. The spoons may also be arranged at the nozzle carrier opposite the nozzles 101.

In order to achieve symmetrical flame propagation also if the 'clouds' of ignitable mixture are formed outside the recess in the piston, two pairs of electrodes, offset against each other by 180°, are provided on the circumference of the nozzle carrier in the region of the nozzles 10 and 101. The circumference of the recess 31 in the piston is shaped so as to prevent the piston from coming into contact with the electrodes and to provide room for the 'clouds' of ignitable mixture.

If the recess 31 in the piston is spherical, it may be advantageous to keept the gap between the nozzle carrier and the piston crown very narrow and to increase the space for receiving the projecting nozzles 10 in the piston crown by providing appropriate semicircular enlargements. A compact, hot ignition jet is discharged from each of the two recesses for the nozzles 10. The nozzle 101 and the electrodes 11 are then disposed in the region of the end face of the nozzle carrier.

The recess in the spoon 35 may be replaced by a channel which runs out helically from the spoon 35 into the recess 31 of the piston in order to direct the fuel discharged from the downwardly slanting nozzles 101 or the nozzles 10 into the recess 31, whereby the enriched ignitable mixture which forms in the recess 31 becomes ignited by the electrodes located on the nozzle carrier 6 in the nozzle region and on the circumference of the nozzle carrier and/or by the electrodes provided on the end face of the nozzle carrier.

The efficiency of the igniting spark may be increased if the edge of the recess in the piston is constructed as a second electrode and if, in addition, the piston, the engine housing and the piston rod are connected to each other in an electrically conducting manner.

The most appropriate placing of the electrodes on the circumference and in the region of the end face of the nozzle carrier will depend upon the position of the ignition mixture at the moment of sparking.

The spoons 35 provided in the region of the recess in the piston swirl the flow in the region of the nozzle carrier. These spoons 35 may also be used to advantage in the embodiment of the invention in which the ignitable mixture is formed in the recess 31 in the piston. Microturbulence in the region of the recess in the piston and of the nozzle carrier facilitates the formation of the ignitable mixture, reduces the rate of flow in the region of the electrodes and mixes the residual gas flowing around the nozzle carrier with fresh gas. Discontinuous combustion and pressure fluctuations in the cylinder are avoided.

Engine control may be effected by varying the volume of the basic mixture and its air ratio. Changing the cross-section of the nozzles 10 is unnecessary if the controllability of the engine, the utilization of air and the distribution of fuel in the basic mixture are not required to meet very exacting demands. Since the final combustion pressure in the engine described is in the range of the final compression pressure, no burning gas will flow into the open nozzles 10 if a relief valve is used. If the nozzles 10 are closed upon completion of the mixture forming process by means of needles, for example, they must be opened comparatively slowly at the beginning of the next mixture forming process, taking into account the pressure of the fuel in the fuel line and the full vaporizing device, which is initially comparatively high.

Alternatively, a relief valve which is briefly opened upon completion of the mixture forming process may be used instead of the nozzle needles. This relief valve may be provided either in the fuel line or in the fuel vaporizing device.

Finally, the outlet valve may also take the form of a sleeve valve, while the intake valve is disposed in the cylinder head as described, both valves being coaxially located on the longitudinal axis of the cylinder. Microturbulence in the in-flowing air may be reduced even more effectively if the inlet channel is funnel-shaped in the region of the cylinder head.

OPERATION

The function of the engine and the advantage obtainable from practice of the invention are described below:

Air flows from the intake channel 15 into the tubular outlet valve 3. The air is acted on by the movable guide vanes 27 which are located in the outlet valve 3 and has a rotary motion imparted thereto. The piston-swept and compression spaces of the cylinder are symmetrical about the cylinder axis and a free fluid flow is generated therein which shows no special peculiarities, the positions of the moving gas particles with respect to each other are substantially stable.

The vortex in the cylinder and the secondary motion of the air when the air flows from the piston-swept space into the compression space and thereby contacts the jets of fuel and forces them to flow substantially along a circular path at their ends while being disintegrated establish a well defined basic mixture which is enclosed in a ring, or a cylinder, of pure air.

An important advantage is the result that, when lean mixtures are burned, the maximum flame temperature becomes lowered, which brings about three essential improvements: the thermal and frictional losses decrease, the dissociation is lower and, as the gas taken in is only slightly throttled, the pumping losses are reduced. The thermal efficiency of the engine due to these improvements is greatly raised.

The reduction of the maximum flame temperatures causes a considerable drop in the amount of oxides of nitrogen in the exhaust gas. As the combustion occurs in a space in which the volume of the ignition mixture is small, no zones of a high flame temperature are created, thus the creation mixture of nitrogen oxides is considerably reduced.

The creation of nitrogen oxides is further reduced by the expansion of the burning mixture zone, which is not dependent on the movement of the piston alone, since the ring of pure air is compressed.

The manner in which the mixture is formed according to the present invention not only enables a mixture zone to be formed which is enclosed by a ring of pure air, but also enables the fuel to be substantially evenly distributed in said mixture zone, which also counteracts the formation of pollutants with respect to nitric oxides.

As there is, furthermore, an excess of air in the basic mixture and because the volume of the ignition mixture zone is so small, the arising of carbon monoxide is prevented in addition.

How the basic mixture, which is transformed into hot burning gases during combustion, acts with respect to the amount of hydrocarbons in the exhaust gas and with respect to the thermal efficiency may best be described as follows: by the deflection of the jets of fuel, the ends of which are located upon essentially circular paths, the basic mixture is encased by a transition zone which is small in volume and which separates the basic mixture from the enveloping air. During combustion and expansion, the shape of the basic mixture (burning gases) substantially retains its rotary symmetry, because the buoyancy forces which go into action (as the temperature difference is so great between the hot burning gases and the air which does not participate in the combustion, and also because the gas rotates) maintain the hot burning gases in the inner and intermediate regions of the piston-swept space and the compression space. The transition layer between the hot burning gases and the cold air becomes heated during the combustion and the expansion and the hydrocarbons which may be present in the transition zone will become burned.

The residual gas which does not become exhausted contains hydrocarbons, noxious materials from the cloud of ignitable mixture and a portion of the residual gases from the transition zone; this gas will be burned during the next following expansion stroke. During the intake stroke, the hot residual gas is forced into the inner region of the cylinder by the inflowing rotating cold air. This gasdynamic process contributes substantially towards the formation of a gas flow around the longitudinal axis of the cylinder which is free from peculiarities.

During operation of the engine, no mixture enters into the slot space between piston and cylinder, and this means that the amount of hydrocarbons in the exhaust gas is, therefore, lowered still more.

When the engine is cold, no fuel condenses on the wall of the cylinder and the cylinder head. This brings about an improvement of the quality of the exhaust gas and a decrease of the wear and tear on the engine as there is no fuel washed off the cylinder wall surface. The amount of oil consumed is lowered, and the lubricating performance of the oil is not reduced because fuel becomes mixed into it. Also the probability of the engine dying is decreased as the lubricating film upon the cylinder affords a continuous protection, there is no binding or seizing of the piston. To this must be added that the thermal efficiency of the engine is further raised substantially due to the lowered heat transition into the cylinder, cylinder head and piston during the combustion and the expansion because the air ring, or air cylinder which surrounds the hot burning gases has an insulating effect. The heat losses caused by the nozzle carrier and the recess in the piston are more than balanced by the insulating effect of the air ring or air cylinder.

The engine may be operated with gasoline, gasoline-methanol mixtures, methanol, ethanol, liquified petroleum gas and all gaseous fuels, i.e., fuels which need not be vaporized. If gaseous fuels are used, the fuel vaporizing device is replaced by means which deliver the gaseous fuel in accordance with the operating parameters of the engine.

The mixture zone expands during combustion and compresses the ring or cylinder of air by which it is surrounded. The thermodynamic compression of the burning gases and the mixture and the peak temperatures of the burning gases remain relatively low, which reduces the formation of nitrogen oxides and increases thermal efficiency. Moreover, the compression ratio can be very high, even if fuels with regular octane numbers are used, without causing pressure-rise knock, which, in turn, has a favorable effect on thermal efficiency. The short flame travels owing to the centrally located igniting device and the small mixture diameter favor the rapid completion of combustion. This is another advantage with regard to consumption. The favorable surface-to-volume ratio of the mixture zone is still another advantage. All these features contribute towards reducing the specific fuel consumption of the engine. Furthermore, the engine may be operated at a very high air ratio, which has the effect that consumption is considerably reduced.

What is claimed is:

1. A piston engine comprising: a cylinder having an internal wall, a cylinder head, a piston reciprocatingly received in said cylinder and defining a compression space in said cylinder, at least one ignition device disposed in said compression space, an outlet channel and an outlet valve, an inlet channel in said cylinder head communicating with the cylinder through an inlet port, an end portion of said inlet channel and said inlet port being substantially coaxial with said cylinder, an inlet valve disposed substantially coaxially with the longitudinal axis of said cylinder being received in said cylinder head and closing said inlet port, means for imparting a helical rotating movement to the air unmixed with fuel around the longitudinal axis of the cylinder within said inlet channel during the intake of the air into the cylinder, the already helically flowing air flowing into the cylinder substantially turbulence free to form a cylinder of helically flowing air in the piston-swept and compression space, a nozzle carrier carried by said inlet valve being an end projecting beyond said inlet valve into the compression space, at least one nozzle means being provided on said nozzle carrier spaced inwardly of said inlet valve in said compression space and having an outlet aperture directed in a substantially outward direction relative to the longitudinal axis of the cylinder for injecting or blowing a jet of fuel into the cylinder of helically flowing air, the rotating air distintegrating the fuel jet to form a combustible air-fuel mixture surrounded by a rotating ring or cylinder of pure air and partially or completely flowing between said nozzle means and said inlet valve.

2. The piston engine of claim 1 including a plurality of nozzle means having apertures oriented in different directions.

3. The piston engine of claim 2 wherein said nozzle apertures are oriented in directions opposite to each other.

4. The piston engine according to claim 1 wherein said inlet valve is movable axially within said inlet channel, and when opened, defines an annular flow path for the rotating intake air in the region of said inlet port, the annular flow path being coaxial with said inlet channel and cylinder.

5. The piston engine of claim 1 wherein at least one nozzle outlet aperture is directed outwardly with a circumferential component with respect to the longitudinal axis of the cylinder.

6. The piston engine of claim 1 wherein at least one nozzle outlet aperture is directed outwardly with an axial component with respect to the longitudinal axis of the cylinder.

7. The piston engine of claim 1 including a plurality of nozzle outlet apertures directed outwardly with both a circumferential and an axial component with respect to the longitudinal axis of the cylinder.

8. A piston engine as claimed in claim 1 wherein said nozzle means comprises a plurality of first nozzle provided in the lower region of the compression space and wherein the nozzle outlet apertures are disposed eccentrically to the longitudinal axis of the cylinder.

9. A piston engine as claimed in claim 1 wherein the size of the aperture of the nozzle means is variable.

10. A piston engine as claimed in claim 1 wherein the nozzle carrier carries an ignition device.

11. A piston engine as claimed in claim 1 wherein the piston includes a crown and a substantially parabolic-shaped depression in the piston crown.

12. A piston engine as claimed in claim 1 wherein the piston includes a crown and the piston crown includes a recess in the region of the longitudinal axis of the cylinder for receiving the nozzle carrier at predetermined times.

13. A piston engine as claimed in claim 1 wherein the outlet valve is tubular and is disposed coaxially with the inlet valve, said outlet valve having openings and forming an inlet channel over part of its length.

14. A piston engine as claimed in claim 1 wherein said nozzle means includes a plurality of nozzles having apertures of different sizes.

15. A piston engine as claimed in claim 1 wherein said nozzle means is located near said end of said nozzle carrier.

16. A piston engine as claimed in claim 1 wherein the piston includes a crown, and including a recess in the crown in the region of the longitudinal axis of the cylinder.

17. A piston engine as claimed in claim 1 including guide vanes in said inlet channel.

* * * * *

UNITED STATES PATENT AND TRADEMARK OFFICE
CERTIFICATE OF CORRECTION

PATENT NO. : 4,450,795
DATED : May 29, 1984
INVENTOR(S) : Josef Schaich

It is certified that error appears in the above—identified patent and that said Letters Patent is hereby corrected as shown below:

Column 12, line 53, delete "valve", insert therefor --device--.
Column 14, line 19, delete "valve", insert therefor --device--.
Column 14, line 20, delete "valve", second occurrence thereof, insert therefor --device--.

Signed and Sealed this

Twenty-fifth Day of December 1984

[SEAL]

Attest:

GERALD J. MOSSINGHOFF

*Attesting Officer*  *Commissioner of Patents and Trademarks*

UNITED STATES PATENT AND TRADEMARK OFFICE
CERTIFICATE OF CORRECTION

PATENT NO. : 4,450,795

DATED : May 29, 1984

INVENTOR(S) : Josef Schaich

It is certified that error appears in the above-identified patent and that said Letters Patent is hereby corrected as shown below:

Claim 1, Column 12, line 67, change "being" to --having--.

Signed and Sealed this

Thirty-first Day of May, 1988

Attest:

DONALD J. QUIGG

*Attesting Officer*

*Commissioner of Patents and Trademarks*